United States Patent

Lange

[11] 4,029,580
[45] June 14, 1977

[54] BIDIRECTIONAL FLOW FILTER-DRIER

[75] Inventor: Harold T. Lange, St. Louis, Mo.

[73] Assignee: Sporlan Valve Company, St. Louis, Mo.

[22] Filed: Oct. 5, 1976

[21] Appl. No.: 729,670

[52] U.S. Cl. .............................. 210/136; 210/264; 210/DIG. 6; 210/DIG. 7
[51] Int. Cl.$^2$ ........................................ B01D 35/12
[58] Field of Search .................. 55/179; 62/474; 210/136, DIG. 6, DIG. 7, 264, 284

[56] References Cited

UNITED STATES PATENTS

| | | | |
|---|---|---|---|
| 3,025,233 | 3/1962 | Figert | 210/24 R |
| 3,178,022 | 4/1965 | Balogh | 210/136 |
| 3,799,347 | 3/1974 | McDuffie | 210/136 X |
| 3,815,752 | 6/1974 | Hoffman et al. | 210/DIG. 6 |
| 3,827,218 | 8/1974 | Settlemeyer | 55/179 |

FOREIGN PATENTS OR APPLICATIONS 45-14235  5/1970  Japan ................................ 62/474

Primary Examiner—Frank A. Spear, Jr.
Assistant Examiner—Richard W. Burks
Attorney, Agent, or Firm—Cohn, Powell & Hind

[57] ABSTRACT

A filter-drier unit adapted for bidirectional flow in heat pump systems. This filter-drier unit includes an individual filter-drier in each compartment formed on opposite sides of a partition in a shell. A conduit connects the inlet of each filter-drier with the compartment other than the one in which the filter-drier is located. A check valve is connected to the outlet of each filter-drier to enable flow into the compartment in which the filter-drier is located and to preclude backflow, whereby flow into either one of the compartments through an associated shell port passes by the filter-drier in the said one compartment and through the inlet of the filter-drier in the other compartment, and thence into the said other compartment and out through its associated shell port. In one embodiment, the individual filter-driers and the fittings attaching the filter-driers to the partition are relatively laterally offset in the shell. In another embodiment, the individual filter-driers on opposite sides of the partition are disposed in substantial endwise alignment in the shell.

10 Claims, 5 Drawing Figures 4,029,580

BIDIRECTIONAL FLOW FILTER-DRIER

BACKGROUND OF THE INVENTION

This invention relates generally to improvements in a filter-drier unit, and more particularly to a bidirectional flow filter-drier unit for use in the liquid line of reverse-cycle refrigeration and air-conditioning systems, more commonly known as heat pumps.

There are many filter-driers in existence which have been and can be used in heat pumps, but these filter-driers are designed for refrigerant flow in one direction only so that if there is a backflow, solid contaminants that were picked up in the forward flow direction are released to the system. Consequently, the use of these existing filter-driers requires the use of two such filter-driers in the liquid line with suitable bypass valves and piping tht restrict flow in one direction or requires additional liquid line piping in association with bypass valves when a single filer-drier is utilized.

Of course, an alternative to installing the existing filter-drier in the liqud line of a heat pump system, would be to install such filter-drier in the common suction line. However, such a filter-drier would have to be materially larger in size to minimize pressure drop because it would be handling vapor rather than liquid flow. In any event, many system designers prefer the filter-drier be located in the liquid line to protect the expansion valves.

These existing filter-driers cannot be back-flowed without detrimental effects, and their use requires either more than two connections, additional piping or an oversized filter-drier unit in the suction line leaving the expansion devices unprotected from contamination.

SUMMARY OF THE INVENTION

The present filter-drier unit can be used in the liquid line of a heat pump system without requiring more than two connections or additional liquid line piping, and does not result in the release of any contaminants, previously removed, back into the system upon reversal of liquid flow. The filter-drier unit includes a partition in a shell the provides separate compartments, each of which connects to a flow port. Located in each compartment, is a filter-drier means. Conduit means connects the inlet of each filter-drier means with the compartment other than the one in which the filter-drier means is located. A check valve means is connected to the outlet of each filter-drier means to enable flow into the compartment in which the filter-drier means is located and to preclude backflow. With this structural arrangement, flow into either one of the compartments through the associated shell port passes by the filter-drier means in the said one compartment and throught the inlet of the filter-drier means in the other compartment, and thence passes into the said other compartment through the outlet and check valve means of the filter-drier means in the said other compartment, and passes out of the associated shell port of the said other compartment.

The conduit means includes passeges through the partition that connects the inlet of each filter-drier means with the compartment other than the one in which the filter-drier means is located. In one embodiment, the conduit means includes a fitting that attaches each filter-drier means to the partition, each fitting having a passage that connects the inlet of the associated filter-drier means with the compartment other than the one in which the said associated filter-drier means is located.

In this latter embodiment of the invention, the filter-drier means and the fittings attaching the filter-drier means to the partition are relatively laterally offset in the shell and more particularly, are relatively laterally offset from the longitudinal center axis of the shell.

In another embodiment of the invention, a single fitting is secured to the partition and to each filter-drier means, the fitting being provided with separate passages, one of the passages connecting the inlet of one filter-drier means with the compartment other than the one in which the said one filter-drier means is located, and another of the passages connecting the inlet of the other filter-drier means with the compartment other than the one in which the said other filter-drier means is located.

In this latter embodiment of the invention, the filter-drier means on opposite sides of the partition are disposed in substantial endwise alignment in the shell, and more particularly, are disposed in substantial alignment on the same longitudinal center axis of the shell.

DESCRIPTION OF THE PREFERRED EMBODIMENT

Figure 1:
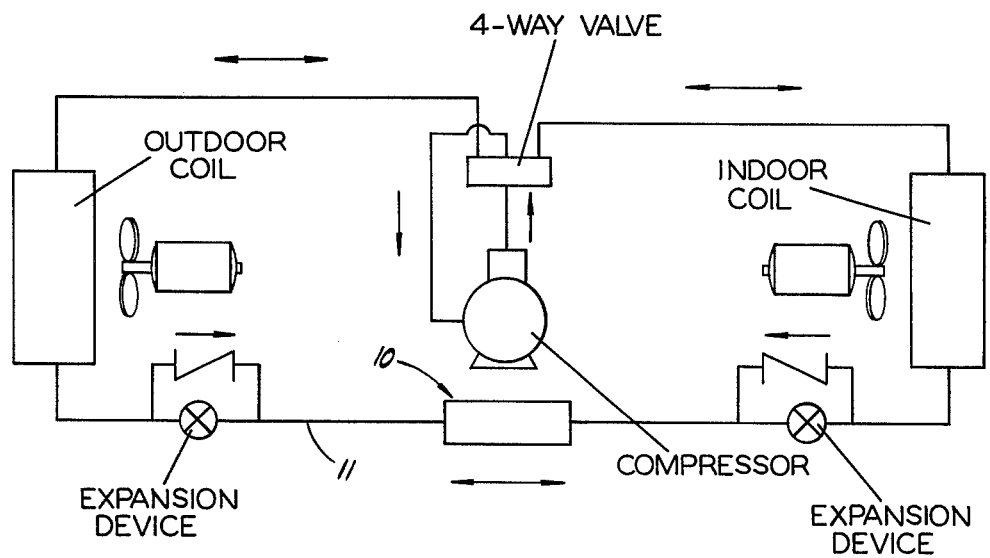
FIG. 1 is a diagram of a heat pump system utilizing the present filter-drier unit in the liquid line.

Referring now by characters of reference to the drawings, and first to FIG. 1, it will be understood that the heat pump system in which the present filter-drier unit 10 can be used, includes a compressor connected through a four-way valve to an outdoor coil and an indoor coil, the outdoor and indoor coils being interconnected by a liquid line 11. A pair of expansion devices are located in the liquid line 11, one such expansion device being located ahead of the outdoor coil for use in one mode of operation and another such expansion device being located ahead of the indoor coil for use in the other mode of operation. The filter-drier unit 10 is located in the liquid line 11 between the expansion devices so as to provide protection for both such devices.

Figure 2:
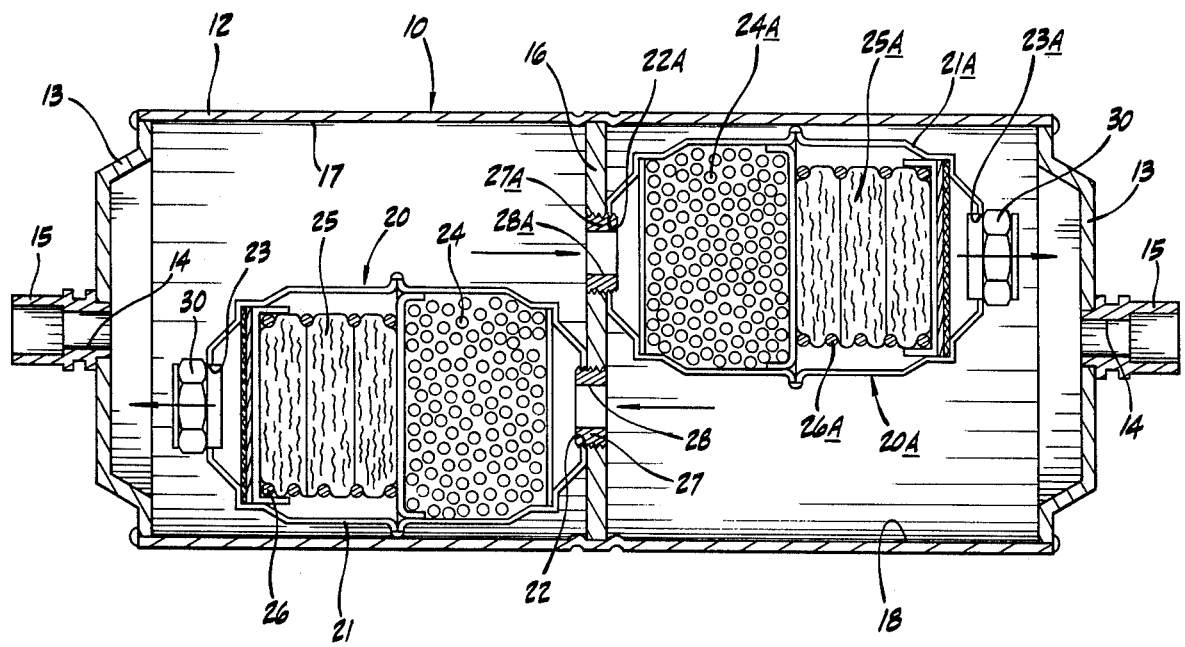
FIG. 2 is a longitudinal cross-sectional view of one embodiment of the filter-drier unit.

One embodiment of the filter-drier unit 10 is illustrated in FIG. 2. In this embodiment, the filter-drier unit 10 includes a substantially cylindrical shell 12 closed at the end by caps 13. Flow ports 14 are provided in the end caps 123 by the end connections 15.

Fixed to the shell 12 and extending across the interior substantially at mid-length, is a partition 16 that provides separate interior compartments 17 and 18. Each of the compartments 17–18 connects to one of the flow ports 14.

Located in each of the compartments 17–18, is an individual filter-drier means 20 and 20A respectively, that may be of any suitable construction such as that disclosed in U.S. Pat. No. 3,025,233 or in U.S. Pat. No.

3,815,752. The filter-drier means 20 and 20A in FIG. 2 are fully disclosed in U.S. Pat. No. 3,815,752 and such detailed description is incorporated by reference.

Because the component parts are identical, the filter-drier means 20 and its connection will be briefly described and such description will suffice for the other filter-drier means 20A and its connection. The only difference is that the reference numerals for the filter-drier means 20A and its connection will have the suffix letter A.

Briefly, the filter-drier means 20 includes a housing 21 having an inlet 22 at one end and an outlet 23 at the other end. An adsorbent material bed 24 is contained in the housing 21 adjacent the housing inlet 22. A filter media of inorganic fibrous material 25 is disposed in a wire form 26 extending substantially to and between the adsorbent material bed 24 and the housing outlet 23.

A conduit means connects the inlet 22 of filter-drier means 20 with the compartment 18, which is the compartment other than the one in which the filter-drier means 20 is located. This conduit means, in the embodiment of FIG. 2, includes a fitting 27 threadedly attached to the partition 16 and having a passage 28 through the partition 16 that connects the inlet 22 of the associated filter-drier means 20 with the compartment 18. Disposed in the outlet 23 of filter-drier means 20 is a check valve means 30 that enables flow only into the compartment 17 in which the filter-drier means 20 is located, and precludes backflow through such filter-drier means 20.

Figure 4:
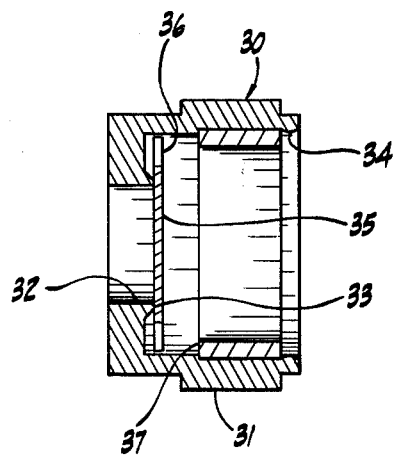
FIG. 4 is an enlarged longitudinal cross-sectional view of the check valve assembly utilized in the embodiments of FIGS. 2 and 3.
Figure 5:
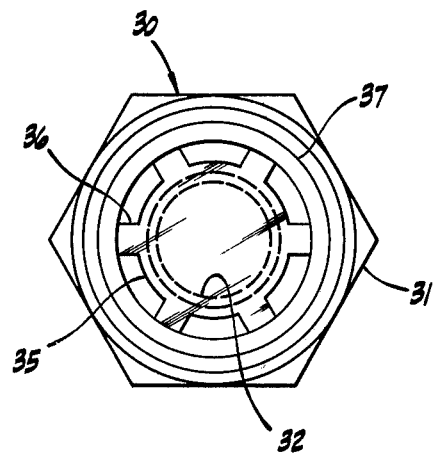
FIG. 5 is an end view of the check valve assembly from the right of FIG. 4.

The details of construction of the check valve means 30 are best shown in FIGS. 4 and 5. It includes a tubular casing 31 provided with an inlet valve port as defined by a valve seat 33 at one end, and an outlet 34 at the opposite end. Movably mounted in the tubular casing 31 and selectively engaging the valve seat 33 under liquid pressure, is a valve plate 35. The valve plate 35 is provided with radially extending, peripherally spaced fingers 36. A cylindrical, tubular stop 37 is disposed in and attached to the tubular casing 31, the stop 37 engaging the valve plate fingers 36 to limit the movement of the valve plate 35 as it moves away from its valve seat 33 to open the valve port 32 under liquid pressure. When the value port 32 is opened, the flow is through the port 32, between the valve plate fingers 36 and past the stop 37 for discharge through the outlet 34. Liquid pressure on the opposite side of the valve plate 35 will move the valve plate 35 against the valve seat 33 and close the valve port 32, thereby preventing backflow in the associated filter-drier means 20 and 20A.

From FIG. 2, it will be understood that the filter-drier means 20 and 20A and the associated fittings 27 and 27A are relatively laterally offset in the shell 12. More particularly, they are laterally offset from the longitudinal center axis of the shell 12.

It is thought that the operation of the filer-drier unit 10 has become apparent from the foregoing detailed description of parts, but for completeness of disclosure such operation will be briefly described.

With filter-drier unit disposed in the liquid line 11 of a heat pump system in the manner shown in FIG. 1, it will first be assumed that flow is into the compartment 17 through its associated shell port 14. As the refrigerant liquid flow passes into the shell compartment 17 through the port 14, the check valve means 30 of the filter-drier means 20 located in the compartment 17, will close to preclude backflow through such filter-drier means 20. The liquid will pass by the filter-drier means 20 and will pass into the inlet 22A of the the filter-drier means 20A through the fitting passage 28A. The liquid passes through the filter-drier means 20A and is discharged into the shell compartment 18 in which such filter-drier means 20A is located through the associated check valve means 30. The liquid then is discharged from the compartment 18 through the associated shell port 14 in connection 15.

Flow of the refrigerant liquid in the opposite direction in the liquid refrigerant line 11 will cause liquid to enter the shell compartment 18 through the associated shell port 14 in connection 15 at the right hand end of FIG. 2. The liquid pressure will cause the check valve means 30 of the filter-drier means 20A to close to prevent backflow through such filter-drier means 20A. The liquid will pass by the filter-drier means 20A in the compartment 18 and pass into the inlet 22 of the filter-drier means 20 through the fitting passage 28. After passing through the filter-drier means 20, the liquid passes into the shell compartment 17 through the check valve means 30 of the filter-drier means 20, and then is discharged from the compartment 17 through the associated shell port 14 in the connection 15.

Figure 3:
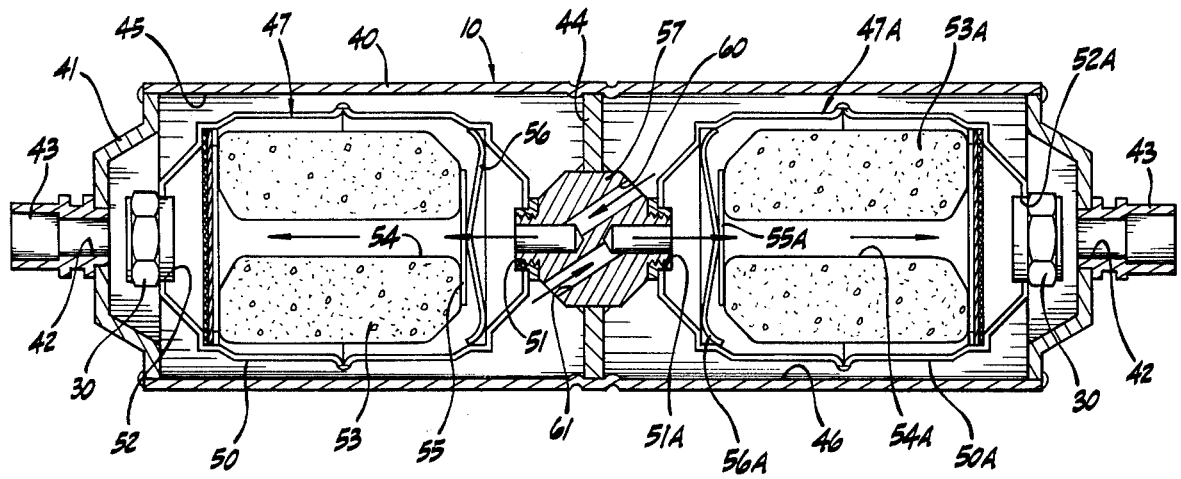
FIG. 3 is a longitudinal cross-sectional view of another embodiment of the filter-drier unit.

The embodiment of the filter-drier unit 10 of FIG. 3 includes an elongate cylindrical shell 40 with opposite end caps 41 and end ports 42 provided by end connections 43. A partition 44 extends across the interior of the shell 40 to provide separate compartments 45 and 46. A filter-drier means 47 and 47A is located in each of the shell compartments 45 and 46 respectively. It will be understood that the filter-drier means 47 and 47A disclosed in FIG. 3 is fully described in structure and operation in U.S. Pat. No. 3,025,233 and such is incorporated by reference.

Because the component parts are identical, the filter-drier means 47 will be briefly described and such description will suffice for filter-drier means 47A. The only difference is that the reference numerals for the filter-drier means 47A will have the suffix letter A.

Briefly, the filter-drier means 47 includes a housing 50 having an inlet 51 at one end and an outlet 52 at the opposite end. Disposed in the housing 50 is a porous, molded block 53 of absorbent material, the block 53 being provided with a central flow passage 54. A plate 55 at one end of the block 53 obstructs flow through the central passage 54 and thereby assures flow through the adsorbent material of the block 53 before entry into the central passage 54. A spring strip 56 holds the plate 55 and the block 53 in place.

The outlet 52 of the filter-drier means 47 is provided with a check valve means 30 identical to the one utilized in the embodiment of FIG. 2 and as shown in FIGS. 4 and 5.

Again, a conduit means connects the inlet 51 and 51A of filter-drier means 47 and 47A with the compartments 46 and 45 respectively. This conduit means includes a single fitting 57 secured to the partition 44. The fitting 57 secures each of the filter-drier means 47 and 47A to the partition 44. The fitting 57 includes separate passages 60 and 61, the passage 60 connecting the inlet 51 of the filter-drier means 47 with the compartment 46, which is the compartment other than the one in which the filter-drier means 47 is located. The other passage 61 connects the inlet 51A of the other filter-drier means 47A with the compartment 45, which is the compartment other than the one in which the filter-drier means 47A is located.

With the use of the single fitting 57 in the embodiment of FIG. 3, the filter-drier means 47 and 47A are substantially aligned on the same longitudinal center axis of the shell. This construction allows the use of an outer shell 40 with a smaller diameter to attain the same flow and filtration characteristics as the unit disclosed in the embodiment of FIG. 2.

Assuming that the filter-drier unit 10 of FIG. 3 is located in the refrigerant liquid line 11 of a heat pump system as shown in FIG. 1, and assuming that the direction of flow is such that the liquid enters through the shell port 42 provided by the left end connection 43, the liquid will flow into the compartment 45 and past the filter-drier means 47. The check valve means 30 of the filter-drier means 47 is closed under the liquid pressure to preclude a backflow through the filter-drier means 47. The liquid will pass from the shell compartment 45 and into the inlet 51A of the filter-drier means 47A through the fitting passage 61. After flow through the filter-drier means 47A, the liquid will pass out of the outlet 52A and its associated check valve means 30, and into the shell compartment 46. The liquid then passes out of the shell compartment 46 through the shell port 42 provided by the right end connection 43.

Flow in the opposite direction is similar. For example, when the liquid enters the shell port 42 through the right end connection 43, it will flow in the compartment 46 past the filter-drier means 47A and through the passage 60 in the fitting 57 into the inlet 51 of the filter-drier means 47. The liqud pressure in the compartment 46 will cause the check valve means 30 of the filter-drier means 47A to close and preclude a backflow. The liquid will then pass through the filter-drier means 47 and into the shell compartment 45 through the filter-drier means outlet 52 and its associated check valve means 30. The liquid will then be discharged from the shell compartment 45 through the shell port 42 in the left end connection 43.

I claim as my invention:

1. A filter-drier unit for heat pump systems, comprising:
   a. a shell provided with flow ports,
   b. a partition in the shell providing separate compartments, each of which operatively connects to a flow port,
   c. a filter-drier means located in each compartment, each filter-drier means including an inlet and an outlet,
   d. conduit means connecting the inlet of each filter-drier means with the compartment other than the one in which the filter-drier means is located, and
   e. a check valve means connected to the outlet of each filter-drier means to enable flow into the compartment in which the filter-drier means is located and to preclude backflow.

2. A filter-drier unit as defined in claim 1, in which:
   f. the filter-drier means are spaced from the shell, whereby flow into either one of the compartments through the associated port passes by the filter-drier means in the said one compartment and through the inlet of the filer-drier means in the other compartment, and thence into the said other compartment through the outlet and check valve means of the filter-drier means in said other compartment, and then out of the associated port of the said other compartment.

3. A filter-drier unit as defined in claim 2, in which:
   g. the conduit means attaches the filter-drier means to the partition.

4. A filter-drier unit as defined in claim 2, in which:

g. the conduit means includes passages through the partition that connect the inlets of the filter-drier means with the compartments.

5. A filter-drier unit as defined in claim 2, in which:
   g. the conduit means includes a fitting attaching each filter-drier means to the partition, each fitting having a passage connecting the inlet of the associated filter-drier means with the compartment other than the one in which said associated filter-drier means is located.

6. A filter-drier unit as defined in claim 5, in which:
   h. the filter-drier means and the fittings attaching the filter-drier means to the partition are relatively laterally offset in the shell.

7. A filter-drier unit as defined in claim 6, in which:
   i. the shell has a longitudinal center axis, and
   j. the filter-drier means and the fittings are relatively laterally offset from the longitudinal center axis of the shell.

8. A filter-drier unit as defined in claim 2, in which:
   g. the conduit means includes a fitting secured to the partition and to each filter-drier means, the fitting being provided with separate passages, one of the passages connecting the inlet of one filter-drier means with the compartment other than the one in which said one filter-drier means is located, and another of the passages connecting the inlet of the other filter-drier means with the compartment other than the one in which said other filter-drier means is located.

9. A filter-drier unit as defined in claim 8, in which:
   h. the filter-drier means on opposite sides of the partition are disposed in substantial endwise alignment in the shell.

10. A filter-drier unit as defined in claim 9, in which:
    i. the shell has a longitudinal center axis, and
    j. the filter-drier means are substantially aligned on the same longitudinal center axis of the shell.

* * * * *